Patented Dec. 27, 1927.

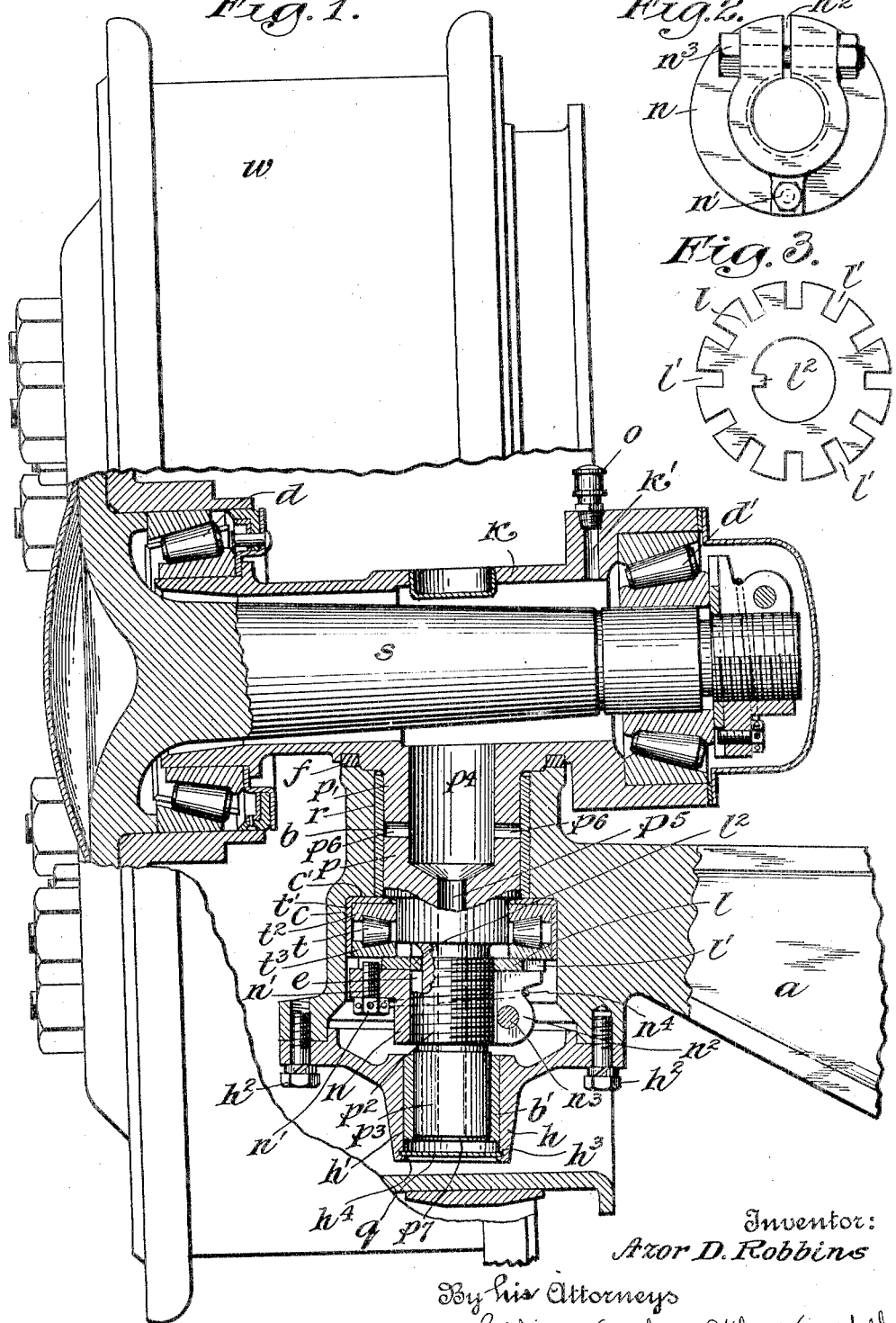

1,654,142

UNITED STATES PATENT OFFICE.

AZOR D. ROBBINS, OF NEW YORK, N. Y., ASSIGNOR TO INTERNATIONAL MOTOR COMPANY, OF NEW YORK, N. Y., A CORPORATION OF DELAWARE.

STUB-AXLE MOUNT.

Application filed December 20, 1926. Serial No. 155,833.

This invention relates to combined removable oil retaining and bearing caps with particular reference to their application in wheel mountings in automotive practice.

In mounting wheels upon dead axles, such as the front axle, it is customary to journal a spindle carried with the wheel in bearings mounted in a knuckle supported upon the axle by a knuckle pin. The knuckle pin may be revolubly journaled in the end of the axle so as to provide means for steering the vehicle. It is, therefore, apparent that the knuckle and knuckle pin form the sole supporting and steadying means for the wheel.

It has formerly been the practice to supply the axle with bifurcated ends, a wheel spindle and knuckle being disposed between the forks at each end and a knuckle pin being journaled between both forks thus providing a satisfactorily rigid mounting for the wheel. But recently it has been found advantageous, especially since the general introduction of front wheel brakes, to form but a single bearing for the knuckle pin in each end of the axle. Obviously then, some new means for steadying the wheel and preventing "shimmying" had to be devised.

Broadly, such means may consist in substantially increasing the length of the knuckle pin and providing an additional radial bearing below that formed in the end of the axle to provide the necessary reaction to transverse stresses impressed upon the wheel. A particular means for accomplishing this has been illustrated in connection with the present invention, wherein the wheel is carried by a spindle journaled in a unitary knuckle and knuckle pin. According to the invention it is proposed to mount the knuckle pin in a radial bearing formed in the end of the axle, wherein is also formed a cavity for the reception of a thrust bearing to carry the weight of the vehicle, and at the end of the knuckle pin there is provided another radial bearing bolted to the axle to provide the necessary reaction and steadying means, this bearing at the same time constituting an oil retaining cap to prevent wastage of the oil used to lubricate the moving parts of the wheel mounting.

The invention will now be described in greater detail in connection with the accompanying drawings, in which:

Figure 1 is a view in elevation of one end of an axle carrying wheel according to the invention, part of the wheel being broken away, and showing, in section, the wheel mounting with the removable oil retaining and bearing cap.

Figure 2 is a view of the retaining nut for the thrust bearing.

Figure 3 is a view of the lock washer for the retaining nut shown in Figure 3.

The end of the axle $a$ is to be supported wholly upon the wheel $w$ through the unitary knuckle and knuckle pins $k$, $p$, the wheel spindle $s$ being journaled in the knuckle $k$ as by the bearings $d$, $d'$.

The end of the axle $a$ is reamed out as at $r$ to receive the portion $p'$ of the knuckle pin $p$, a bushing $b$ being interposed therebetween. Below the portion $r$ the end of the axle has formed therein a shoulder $c'$ and an enlarged cavity $c$ adapted to accommodate the clip $t'$ for the bearing $t$. The knuckle pin $p$ is threaded as at $p^2$ for the nut $n$ between which and the lower race $t^3$ of the bearing $t$ is placed the lock washer $l$, the latter being held in place by a lug $l^2$ formed thereon which fits in a keyway $e$ cut in the knuckle pin. The nut $n$ is split as at $n^2$ so that it may be clamped down upon the threads $p^2$ by means of the bolt $n^3$. The nut $n$ is prevented from turning off by a stud $n'$ which projects with the notches $l'$ cut into the periphery of the lock washer $l$. The stud $n'$ is locked by means of a wire $n^4$ passing through holes in its head and twisted about the nut $n$.

It will be apparent from the foregoing description that the weight of the vehicle carried by the end $a$ of the axle will be transmitted through the shoulder $c'$ to the bearing $t$; from the bearing $t$ to the knuckle pin $p$ through the nut $n$; and from the knuckle pin $p$ through the knuckle $k$ and the bearings $d$ and $d'$ to the wheel spindle $s$ carried with the wheel $w$. But the structure thus far recited is not well adapted to resist transverse stresses impressed upon the wheel by sidesway of the vehicle, irregularities in the roadbed, etc. To satisfactorily resist such stresses and prevent the wheel from wobbling or buckling under the following means were devised.

A removable cap $h$, adapted to be bolted to the end of the axle as by the cap screws $h^2$, is provided. The cap $h$ is reamed out as at $h'$ for the end of the knuckle pin $p^3$, a bushing $b'$ being placed therebetween to take up wear. A shoulder $h^3$ is formed in the end of the cap against which abuts a disc $q$ forming a closure for the bottom of the cap. The edges at the bottom of the cap may be peened over as at $h^4$ to hold the disc in place.

It will now be seen that there have been provided two radial bearings $r$ and $h'$ to resist transverse stresses impressed upon the wheel. This design is particularly effective by virtue of the long knuckle pin used, since it will be seen that the upper radial bearing $r$ may act as a fulcrum and the necessary reaction set up through the lower bearing $h'$ acting through a lever arm equal to the distance between the bearings $r$ and $h'$.

To provide lubrication the knuckle $k$ has formed therein a pasage $k'$ in which is disposed an oil cup $o$. The knuckle pin $p$ is drilled out as at $p^4$—partly to reduce its weight—and this passage is continued at a reduced diameter as at $p^5$ to the end $p^7$ of the pin. Radial passages $p^6$ extend from the passage $p^4$ to the bearing $r$. Thus all the movable elements in the entire wheel mounting may be lubricated by simply injecting oil through the cup $o$, whence the lubricant may flow through the passage $k'$ to the bearings $d$, $d'$; through the pasages $p^4$ and $p^6$ to the bearing $r$; and through the passage $p^5$ to the bearing $h'$. Whatever lubrication is required by the bearing $t$ is supplied by excess. A felt washer $f$ may be provided to prevent leakage of oil between the end of the axle and the knuckle.

Thus there has been provided a removable oil retaining and bearing cap which provides the necessary reaction to transverse stresses impressed upon the wheel, permits assembly of a thrust bearing mounting such as that shown and described, and serves to retain the lubricant used to lubricate the moving parts in the wheel mounting.

It will be obvious that the knuckle pin is revoluble about its own axis in the end of the axle to provide means for turning the wheel in steering.

Nothing that has been said in this specification is intended as a limitation upon the scope of the invention except as indicated in the appended claims.

What I claim is:

1. In a motor vehicle having an axle, a wheel mounting comprising, in combination, a unitary knuckle and knuckle pin, a wheel spindle journaled in said knuckle, a radial bearing for the knuckle pin formed in the end of the axle, a thrust bearing to support the axle upon the knuckle pin, and a removable cap carried by the end of the axle and having formed therein a second radial bearing for the knuckle pin.

2. In a motor vehicle having an axle, a wheel mounting comprising, in combination, a unitary knuckle and knuckle pin, a wheel spindle journaled in said knuckle, a radial bearing for the knuckle pin formed in the end of the axle, a thrust bearing to support the axle upon the knuckle pin, a removable cap carried by the end of the axle and having formed therein a second radial bearing for the knuckle pin, and means comprising passages formed in the knuckle and the knuckle pin to lubricate all the moving parts in the wheel mounting through a single oil cup mounted in the knuckle.

3. In a motor vehicle having the end of an axle supported upon a wheel by a wheel mounting comprising a unitary knuckle and knuckle pin, said knuckle pin being journaled in a radial bearing formed in the end of the axle and carrying a thrust bearing wherewith to support the load carried by the end of the axle, a removable cap adapted to be carried by the end of the axle and comprising a second radial bearing for said knuckle pin.

4. In a motor vehicle having the end of an axle supported upon a wheel by a wheel mounting comprising a unitary knuckle and knuckle pin, said knuckle pin being journaled in a radial bearing formed in the end of the axle and carrying a thrust bearing wherewith to support the load carried by the end of the axle, a removable cap adapted to be carried by the end of the axle and comprising a second radial bearing for said knuckle pin spaced from said first named radial bearing.

5. In a motor vehicle having the end of an axle supported upon a wheel by a wheel mounting comprising a unitary knuckle and knuckle pin, said knuckle pin being journaled in a radial bearing formed in the end of the axle and carrying a thrust bearing wherewith to support the load carried by the end of the axle, a removable cap carried by the end of the axle comprising, in combination, a second radial bearing for said knuckle pin spaced from said first named radial bearing, and means to retain a lubricant used to lubricate the moving parts of the wheel mounting.

This specification signed this 14th day of Dec. A. D. 1926.

AZOR D. ROBBINS.